United States Patent [19]

Virnig et al.

[11] Patent Number: 5,006,993
[45] Date of Patent: Apr. 9, 1991

[54] AUTOMATIC THROTTLE CONTROLLER FOR AIRCRAFT WITH INTERMIXED ENGINES

[75] Inventors: Daniel R. Virnig, Bellevue; Douglas O. Jackson, Mercer Island; Frederick C. Blechen, Redmond, all of Wash.

[73] Assignee: The Boeing Company, Seattle, Wash.

[21] Appl. No.: 273,297

[22] Filed: Nov. 18, 1988

[51] Int. Cl.⁵ ............................................ G06F 15/20
[52] U.S. Cl. ......................... 364/431.01; 364/571.07; 60/39.281
[58] Field of Search ............... 364/551.01, 550, 571.01, 364/571.04, 571.07, 431.01; 73/116, 117.4; 416/34, 35; 60/39.24, 39.281, 39.15

[56] References Cited

U.S. PATENT DOCUMENTS

| | | | |
|---|---|---|---|
| 3,299,630 | 1/1967 | Alper | 60/39.15 |
| 3,368,346 | 2/1968 | Warne | 60/39.15 |
| 3,762,162 | 10/1973 | Miura et al. | 60/39.182 |
| 3,839,860 | 10/1974 | Martin | 60/39.15 |
| 3,852,956 | 12/1974 | Martin | 60/39.15 |
| 4,038,526 | 7/1977 | Eccles et al. | 60/39.15 |
| 4,215,412 | 7/1980 | Bernier et al. | 364/551 |
| 4,259,838 | 4/1981 | McCollum, Jr. et al. | 60/224 |
| 4,366,541 | 12/1982 | Mouri et al. | 364/431.05 |
| 4,621,335 | 11/1986 | Bluish et al. | 364/550 |
| 4,630,212 | 12/1986 | Shigeta | 364/470 |
| 4,639,645 | 1/1987 | Hartwig | 318/51 |
| 4,813,063 | 5/1974 | Martin | 60/39.15 |

Primary Examiner—Thomas G. Black
Attorney, Agent, or Firm—Christensen, O'Connor, Johnson & Kindness

[57] ABSTRACT

An automatic throttle (A/T) controller (23) for controlling the thrust produced by the engines of an aircraft having a mixture of different types of engines (11a, 11b, ... 11n) is disclosed. A code that denotes the type and rating is produced for each aircraft engine. If desired other codes, such as a common rating code, a maximum thrust limit code, etc. can be produced. The codes are read by the A/T controller (23) and used to look up engine type and rating data for a controller channel (25a, 25b, ... 25n) associated with each engine (11a, 11b ... 11n). In a conventional manner, each channel (25a, 25b, ... 25n) uses the type and rating data, and common data, if any, to calculate rating limits, throttle control position and throttle limits, plus allocate gains for dynamic control. The calculated parameters control the production of A/T controller signals that, in turn, control the operation of servo motors (19a, 19b, ... 19n), or some other engine controller, that separately control a position of each engine throttle (17a, 17b, ... 17n) and associated thrust.

26 Claims, 4 Drawing Sheets

| RATING OR TYPE | BINARY CODE |
|---|---|
| 1 | 1 0 0 0 |
| 2 | 0 1 0 0 |
| 3 | 1 1 0 0 |
| 4 | 0 0 1 0 |
| 5 | 1 0 1 0 |
| 6 | 0 1 1 0 |
| 7 | 1 1 1 0 |
| 8 | 0 0 0 1 |
| 9 | 1 0 0 1 |
| 10 | 0 1 0 1 |
| 11 | 1 1 0 1 |
| 12 | 0 0 1 1 |
| 13 | 1 0 1 1 |
| 14 | 0 1 1 1 |
| 15 | 1 1 1 1 |
| 16 | 0 0 0 0 |

AUTOMATIC THROTTLE CONTROLLER FOR AIRCRAFT WITH INTERMIXED ENGINES

TECHNICAL AREA

This invention relates to avionic systems and, more particularly, to aircraft automatic throttle control systems.

BACKGROUND OF THE INVENTION

Contemporary multi-engine jet aircraft are manufactured with two, three, or four jet engines. The engines of two- and four-engine aircraft are mounted on opposite sides of the engine fuselage. The "side mounted" engines may be hung from the wings of the aircraft or, in the case of two-engine aircraft only, attached to the fuselage of the aircraft. In the case of three-engine aircraft, one of the engines is mounted in the fuselage so as to provide thrust along the fuselage axis. The remaining two engines are mounted on opposite sides of the fuselage, or on opposite wings. In order to provide symmetrical thrust, in most instances, the engines mounted on opposite sides of the fuselage of an aircraft are identical when an aircraft is fabricated. That is, even though engine type varies from airplane to airplane depending upon a customer's thrust requirements, which are dependent upon a customer's route structure, fuel utilization requirements and capital limitations, side mounted engines are identical, i.e., they are of the same type and have the same rating, when an aircraft is delivered. Usually, but not necessarily, the mid-engine of a three-engine aircraft is identical to the side mounted engines.

When an engine requires replacement, it is replaced as quickly as possible to minimize aircraft down time. In order to achieve this result, engines are replaced with the most readily available engine having a thrust rating that is appropriate for the aircraft considering current needs and/or route structure. Because modern jet engines can provide a variety of thrust levels with different fuel controllers, replacement engines are not always identical to the engine being replaced. Occasionally, replacement engines are different in thrust and dynamic performance than the engine being replaced. When the engine being replaced is a side mounted engine, such replacement results in an engine mismatch. In the past, when a replacement side mounted engine does not match the remaining side mounted engine, the automatic throttle control system of the aircraft was disabled because current automatic throttle control systems use a common control channel to control the thrust produced by all the engines of a jet aircraft. Obviously, different side mounted engines are likely to produce asymmetrical thrust when controlled by a common thrust control signal.

Under current operating rules of government regulatory agencies (FAA, CAA, etc.), certain automatic procedures, such as automatic landings, are prohibited when an automatic throttle control system is disabled. This may limit the use and cause delays of such an aircraft. More specifically, the operating procedures followed by aircraft with automatic throttle control systems are established by various government agencies. In certain instances, an automatic throttle control system is required for speed control while an aircraft is performing an automatic landing. As noted above, in the past, automatic throttle control systems have been disabled on aircraft with unmatched side-mounted engines, i.e., aircraft with side-mounted engines having differing thrust characteristics. As a result, automatic landing procedures are unavailable to pilots operating such aircraft.

This invention is directed to providing an automatic throttle control system for controlling the engines of multi-engine jet aircraft having unmatched side-mounted jet engines, i.e., jet engines with different thrust ratings and dynamic characteristics. Thus, the invention is directed to eliminating engine intermixing as an item that prohibits the use of an automatic throttle control system by pilots. This is especially important to aircraft operators operating under rules that require an automatic throttle control system to control speed during an automatic landing.

SUMMARY OF THE INVENTION

In accordance with this invention, an automatic throttle (A/T) controller for controlling the thrust produced by the engines of an aircraft having a mixture of different types of engines is disclosed. As used herein, engines of different type means that the thrust-to-throttle schedule of the engines is different by design, the thrust rating of the engines is different and/or the dynamic response of the engines is different and predictable by design, and/or some other characteristic that effects the thrust control of the engines is different. In accordance with the invention, a code that denotes type and rating is provided for each aircraft engine. In addition, if desired, other codes, such as a common rating code, a maximum thrust limit code for a given aircraft, etc., are also provided. The engine specific codes are used by the A/T controller to look up engine type and rating data. The A/T controller also reads common codes, if any, and uses the common codes to determine common data. The A/T controller uses the type and rating for the associated engine, and the common data, if any, to look up and/or calculate rating limits, throttle control position and throttle limits, as well as allocate gains for dynamic control. The looked up, calculated, and allocated parameters are used by A/T controller channels to limit and control the calculation of a separate thrust control signal for each engine. The separate thrust control signals control the position of the throttles and/or a fuel controller of the channel associated with a particular engine such that each engine produces the thrust level called for by a thrust command generated by a suitable source such as an autopilot, or pilot input speed or thrust command. While various types of control systems can be used, preferably, each of the control signals controls the operation of a servo motor that controls the position of an engine throttle, or issues electrical commands to a fuel controller.

In essence, the invention provides a mechanism for providing and utilizing codes that define each engine type and rating, as well as common data, if desired. The type, rating, and common data are used by an A/T controller to control the production of aircraft engine thrust on an engine-by-engine basis. This is accomplished by providing a separate controller channel for each engine. Each channel creates a thrust control signal for a related engine, rather than a common thrust control signal being created for all engines. The control signals control the engines of the aircraft such that the thrust called for by a thrust command is symmetrically produced by the side-mounted engines. As a result, if one side-mounted engine is capable of producing more thrust than the other side-mounted engine of a two-engine aircraft, the first engine is controlled and limited such that both engines produce the same amount of thrust for a particular thrust command. In this way, yawing of the aircraft due to the production of asymmetrical thrust by side-mounted engines is minimized. Because the production of asymmetrical thrust by side-mounted engines is eliminated by the invention, there is no need to disable an A/T controller merely because an aircraft has unmatched side-mounted engines. Since the A/T controller does not need to be disabled, automatic procedures, such as automatic landings, can be made under existing regulatory agency rules.

BRIEF DESCRIPTION OF THE DRAWINGS

The foregoing advantages and features of this invention will become more readily appreciated as the same becomes better understood by reference to the following detailed description when taken in conjunction with the accompanying drawings wherein.

DESCRIPTION OF THE PREFERRED EMBODIMENT

Figure 1:
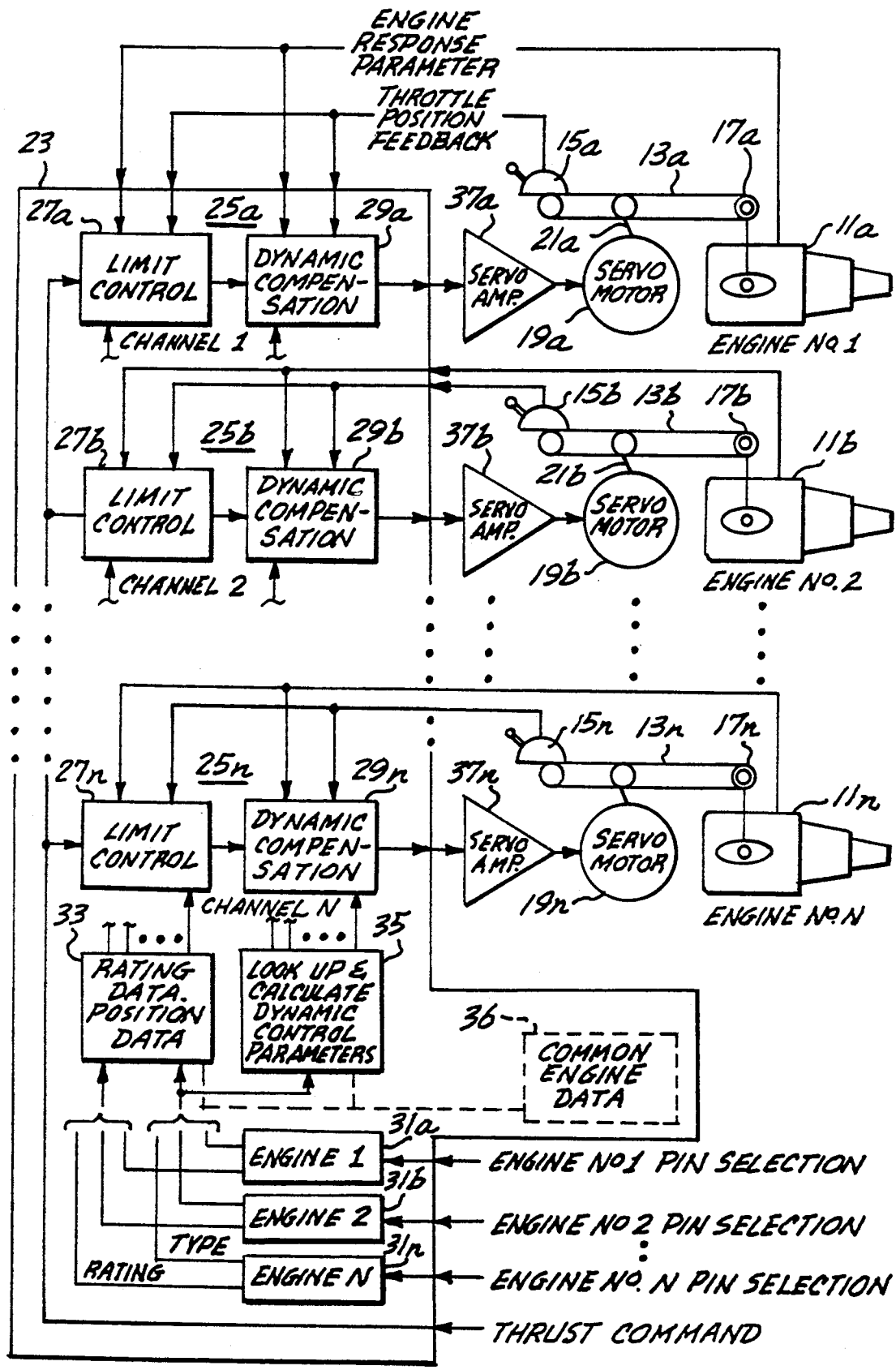
FIG. 1 is a functional block diagram of an A/T controller formed in accordance with the invention.

FIG. 1 illustrates an automatic throttle (A/T) controller 23 formed in accordance with this invention, i.e., FIG. 1 illustrates an A/T controller 23 having the ability to produce a separate thrust control signal for each engine of a multi-engine aircraft based on the type and rating of the engine and other relevant factors. More specifically, FIG. 1 illustrates a plurality of jet engines 11a, 11b, . . . 11n, denoted ENGINE NO. 1, ENGINE NO. 2, . . . ENGINE N, respectively. Typically, the thrust produced by each engine is controlled by a separate, conventional throttle control mechanism, illustratively shown as comprising a loop cable 13a, 13b, . . . 13n that couples a manually actuated throttle mechanism 15a, 15b, . . . 15n to the throttle control input namely a push-pull cable 17b, . . . 17n, of the engines 11a, 11b, . . . 11n. The conventional throttle control mechanism also includes a servo motor 19a, 19b, . . . 19n associated with each engine. The servo motors 19a, 19b, . . . 19n are coupled by a suitable coupling mechanism 21a, 21b, . . . 21n to the loop cable systems 13a, 13b, . . . 13n. As a result, either the manual operation of the manually actuated throttle mechanisms 15a, 15b, . . . 15n or the energization of the servo motors 19a, 19b, . . . 19n can be used to control the throttle setting and, thus, the thrust produced by the engines 11a, 11b, . . . 11n.

In accordance with the invention, the servo motors 19a, 19b, . . . 19n are controlled by the A/T controller 23. As shown in FIG. 1, the A/T controller 23 includes a separate channel 25a, 25b, . . . 25n for each of the engines 11a, 11b, . . . 11n. Each of the channels is illustrated as comprising two functional blocks, one designated limit control 27a, 27b . . . 27n and the other designated dynamic compensation 29a, 29b, . . . 29n.

In addition to the limit control blocks 27a, 27b, . . . 27n and dynamic compensation blocks 29a, 29b, . . . 29n, the A/T controller 23 includes an engine identification block 31a, 31b, . . . 31n for each engine 11a, 11b, . . . 11n; a rating data and position data block 33; and, a look-up and calculate dynamic control parameters block 35. An optional common engine data block 36 is also included in the A/T controller.

The engine identification blocks 31a, 31b, . . . 31n each produce binary codes that designate the type and rating of a related engine 11a, 11b, . . . 11n. As denoted by the engine number pin selection inputs, the engine identification blocks are adjustable. Depending upon the desires of a user of the invention, the engine identification blocks can be electronically or manually adjusted.

Figures 4, 5:
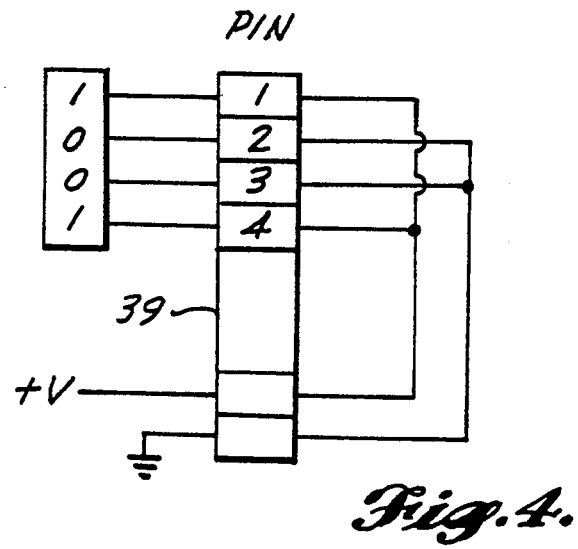
FIG. 4 is a pictorial diagram illustrating one typical mechanism for producing engine type and rating codes suitable for use by the A/T controller illustrated in FIG. 1; and, FIG. 5 is an exemplary binary-to-decimal conversion table denoting the relationship between a decimal rating or type of engine code and a binary code.

Alternatively a data loader or equivalent system can be used as a source of engine type and rating codes. As illustrated in FIG. 4 and described below, the coding can take the form of binary codes created by sensing the voltage on the pins of a terminal block jumpered to ground or a voltage source of suitable magnitude and polarity. Alternatively, switches can be utilized to produce the desired binary code, as well as electronic means, such as a read only memory (ROM). Or as noted above the codes can be established by an external mechanism such as a data loader. Further, as described more fully below, in addition to engine identification blocks 31a, 31b . . . 31n, the A/T controller 23 can include blocks encoded to produce codes for common engine data, such as a common power rating, maximum thrust limit, etc. Such a block is designated an optional common engine data block 36 in FIG. 1. While illustrated as nonadjustable, the common engine data block may be adjustable by, amongst other things, aircraft type, if desired.

The data stored in the engine identification blocks 31a, 31b, . . . 31n (and any other identification blocks) is applied in some manner to the rating data and rating position block 33 and to the look-up and calculate dynamic control parameters block 35. As will be better understood from the following description of FIGS. 2 and 3, the rating data and position data block 35 and the look-up and calculate dynamic control parameters block may, for example, scan the engine identification and any other blocks to determine the rating and type of engines mounted on the aircraft, plus any common data, and store the data read during the scan in a suitable memory (not shown).

Based on the thusly generated rating, type and other data, the rating data and position data block 33 and the look-up and calculate dynamic control parameters block 35 produce data signals that are applied to the limit control and dynamic compensation blocks of the channels 25a, 25b, . . . 25n of the A/T controller 23. More specifically, the rating data and position data block 33 produces data limit control signals that are selectively applied to the limit control blocks 27a, 27b, . . . 27n of each of the channels 25a, 25b, . . . 25n. The look-up and calculate dynamic control parameters block 35 produces parameter signals that are selectively applied to the dynamic compensation blocks 29a, 29b, . . . 29n of the channels 25a, 25b, . . . 25n. In addition, a thrust command signal produced by a suitable thrust command source, such as a pilot, an autopilot, flight or performance management computer system, etc., is applied to the limit control blocks 27, 27b, ... 27n. The limit control blocks 27a, 27b, ... 27n also receive engine response parameter feedback signals from the related engine 11a, 11b, ... 11n; and, throttle position feedback signals from the related throttle position mechanism 15a, 15b, ... 15n. In a conventional manner, well known to those familiar with auto throttles, the limit control blocks 27a, 27b, ... 27n produce thrust error signals based on the thrust command, the engine response parameter and the throttle position feedback signals, limited by the limit signals produced by the rating data and position data block 33. The error signals produced by the limit control blocks 27a, 27b, ... 27n are applied to the related dynamic compensation block 29a, 29b, ... 29n. The dynamic compensation blocks modify the error signals produced by the related limit control block based on the signals produced by the look-up and calculate dynamic control parameters block 33, the engine response parameter signal and the throttle feedback position signal. The dynamic compensation error signal is applied via a related channel servo amplifier 37a, 37b, ... 37n to the related engine servo motor 19a, 19b, ... 19n. Alternatively, the dynamic compensation error signal could form a command input to a full authority electronic engine control system.

As will be readily appreciated by those familiar with aircraft avionic systems, particularly the auto throttle controller portion of avionic systems, the functions performed by the limit control blocks 27a, 27b, ... 27n and the dynamic compensation blocks 29a, 29b, ... 29n are actually performed by a suitably programmed central processing unit (CPU) or by a distributed data processing network. Likewise, the functions performed by the rating data and position data block 33 and the look-up and calculate dynamic control parameters block 35 are performed by a suitably programmed CPU. The major difference between prior A/T controllers and an A/T controller 23 produced in accordance with this invention is that the A/T controller of the present invention includes a separate limit control/dynamic compensation channel 25a, 26b, ... 25n for each engine, rather than a common limit control/dynamic compensation channel for all engines. That is, in the past, a common signal for controlling the throttle position of all of the engines of a multi-engine jet aircraft has been produced by A/T controllers. While multiple channels may have been included in prior A/T controllers, they have not been used to produce a separate thrust control signal for each engine. It is this ability that allows an A/T controller 23 formed in accordance with this invention to control a mixture of different types of engines that, in turn, allows the A/T controller to control speed control while an aircraft is performing an automatic landing, or any other maneuver requiring symmetrical thrust.

Figure 2:
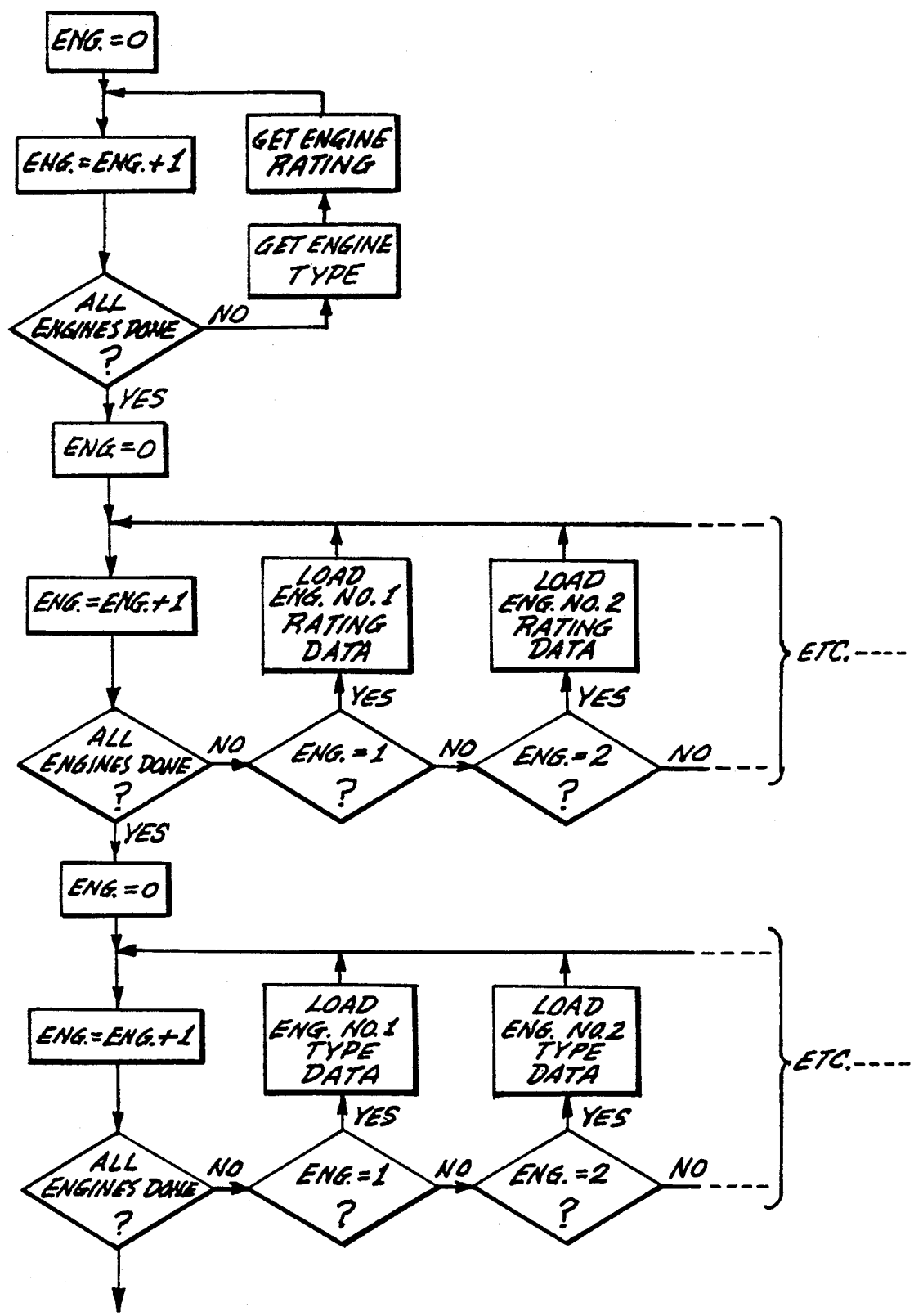
FIG. 2 is a flow diagram illustrating a program suitable for use in the A/T controller illustrated in FIG. 1 to determine the type and rating of aircraft engines and the loading of this information into a memory (not separately illustrated) that forms part of the A/T controller.
Figure 3:
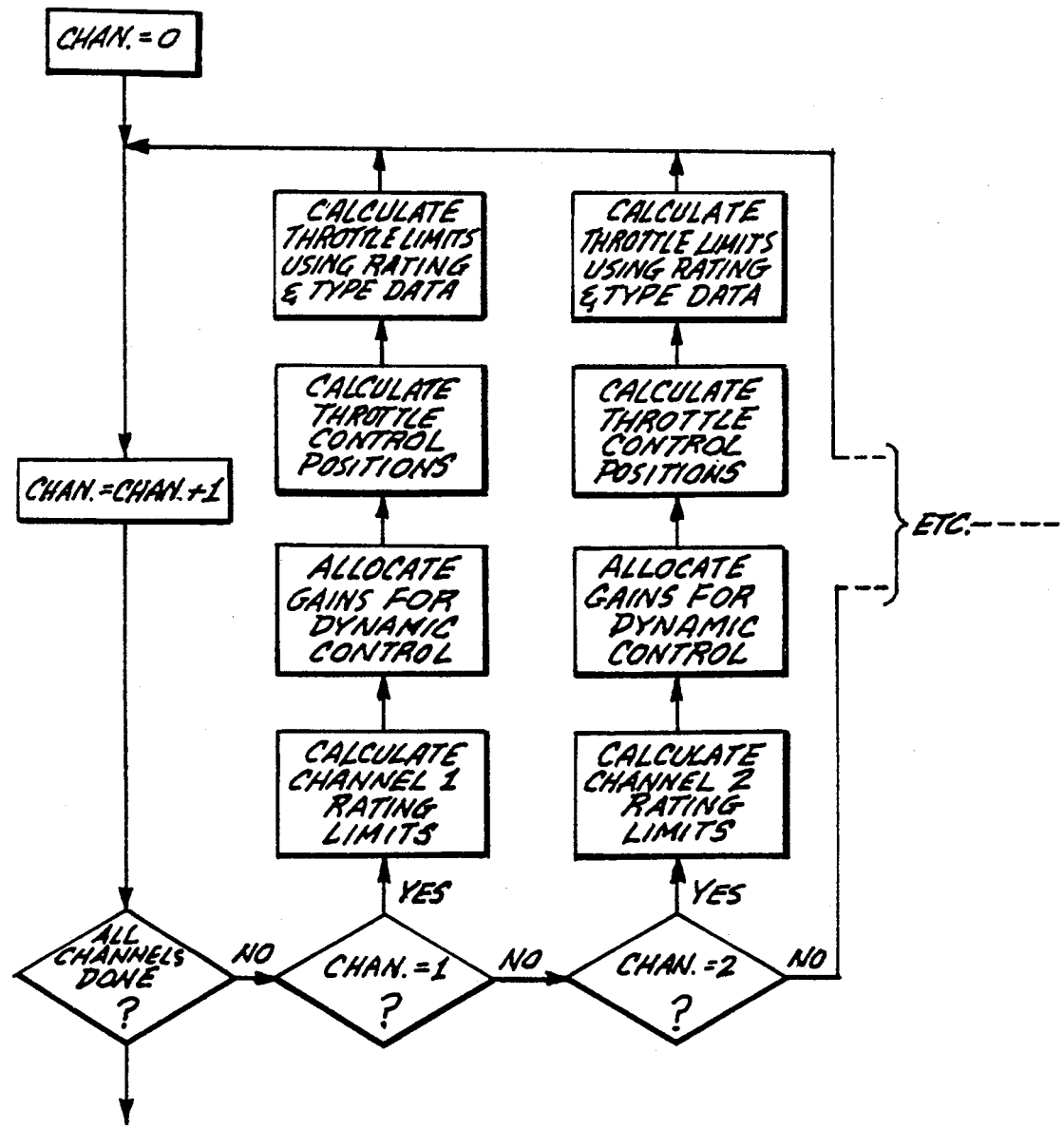
FIG. 3 is a flow diagram illustrating a program suitable for use by the A/T controller illustrated in FIG. 1 to generate for each engine the data needed by the channels of the A/T controller.

As noted above, the limit control blocks 27a, 27b, ... 27n dynamic compensation blocks 29a, 29b, ... 29n, the engine identification blocks 31a, 31b, ... 31n, the rating data and position data block 33 and the look-up and calculate dynamic control parameters block 35 are all functional blocks, i.e., they denote various functions performed by an A/T controller formed in accordance with this invention. While the functions of these blocks could be formed by discrete circuitry, as also noted above, preferably, the functions of the blocks are performed by a suitably programmed central processing unit (CPU), or several CPU's connected together to form a distributed data processing network. Preferably, the same CPU or CPU network is used to control and/or perform a variety of other avionic functions. FIGS. 2 and 3 illustrate, in flow diagram form, the portions of a CPU program designed to carry out the functions of the rating data and position data blocks 33 and the look-up and calculate dynamic control parameters blocks 35. Because the functions performed by the limit control blocks 27a, 27b, ... 27n and the dynamic compensation blocks 29a, 29b, ... 29n are well known in the avionics art, albeit in the past performed in a single channel that creates a single thrust control signal, flow diagrams depicting the operation of these blocks are not described herein.

The first step in the program illustrated in FIG. 2 is to zero an engine counter denoted ENG. The next step is to increment the engine counter by one, i.e., ENG=ENG+1. Next, a test is made to determine if all of the engine identification blocks 31a, 31b ... 31n have been read. This is determined by comparing the present value of ENG with a value denoting the number of engines on the aircraft. If all of the engine identification blocks have not been read, the binary codes for the engine type and rating values are read from the ENG associated engine identification block 31a, 31b, ... 31n. Thus, if ENG=1, the binary codes for the type and rating of the first engine are read from the first engine identification block 31a. If ENG=2, the binary codes for the type and rating of the second engine are read from the second engine identification block 31b. As the engine type and rating codes are read, they are stored in suitable memory bins (not shown). This procedure continues until the binary codes for the type and rating for the last engine are read from the engine identification blocks. At this point, the ALL ENGINES DONE test is passed.

The next step in the program illustrated in FIG. 2 is to rest the value of the engine counter (i.e., ENG) to zero. Next, the engine counter value (ENG) is incremented (ENG=ENG+1). Then, a test is made to determine if the rating data for all of the engines has been loaded into a memory of the CPU carrying out the program. In essence, this is accomplished by determining whether the current value of ENG is greater than the number of engines on the aircraft. If all of the engines are not done, a test is made to determine if ENG=1. If ENG=1, the rating data for engine 1 is looked up in an engine rating table, based on the engine rating code read from the first identification block 31a in the preceding sequence. The looked up data is loaded into the CPU memory. Thereafter, ENG is incremented and the ALL ENGINES DONE test is again performed. Assuming that ENG=2, the ENG=1 test is not passed. As a result, the program cycles to a test that determines if ENG=2. Since ENG=2, the test is passed. As a result, the rating data related to engine 2 is looked up in an engine rating table, based on the engine rating code read from the second identification block 31b in the preceding sequence, and loaded into the CPU memory. Thereafter, ENG is incremented and the ALL ENGINES DONE test performed again. This sequence of operation continues until the rating data for all of the engines has been loaded into the CPU memory. Thereafter, the engine counter (ENG) is again zeroed. Then, the engine counter (ENG) is incremented, i.e., ENG=ENG+1. Next, a test is made to determine if the type data for all the engines has been loaded into the CPU memory. This is accomplished by comparing the current value of ENG with the number of engines on the aircraft. If the ALL ENGINES DONE test is not passed, a test is made to determine if ENG is equal to 1. If ENG=1, the type data for engine 1 is looked up in an engine type table, based on the engine type code read from the first engine identification block 31a in the preceding sequence, and loaded into the CPU memory. Thereafter, ENG is incremented and the ALL ENGINES DONE test performed again. If this test is not passed, ENG is again tested to determine if ENG=1. Assuming ENG=2, this test is not passed whereby the program cycles to a test that determines if ENG is equal to 2. If ENG is equal to 2, the type data for engine 2 is looked up in the engine type table, based on the engine type code read from the second engine identification block 31b, and loaded into the CPU memory. This sequence of operation continues until the ALL ENGINES DONE test is passed. At this point, the subroutine illustrated in FIG. 2 ends and the operation of the CPU cycles to the next section of its overall program, which may be the sequence of steps illustrated in FIG. 3 and described next. Alternatively, if included, the binary codes stored in one or more common blocks are read and related data looked up and stored in the CPU memory before the program cycles to another subroutine, such as the one illustrated in FIG. 3 and described next.

The first portion of the program subroutine illustrated in FIG. 3 is to zero a channel counter designated CHAN. Thereafter, the channel counter is incremented by one, i.e., CHAN=CHAN+1. Next, a test is made to determine if all channels have been done. This is accomplished by comparing the present value of CHAN with the number of channels of the A/T controller 23, which, as noted above, is equal to the number of engines. If all channels have not been done, a test is made to determine if CHAN=1. If CHAN=1, a series of calculations designed to perform the functions of the rating data and position data block 33 and the look up and calculate dynamic control parameters block 35 for the first channel 25a are carried out. These calculations include calculating rating limits for the first channel, allocating gains for dynamic control, and calculating throttle control positions, plus calculating throttle limits using rating and type data. Because calculations for single channel A/T controllers are well known to persons familiar with A/T control systems, and because the same calculations can be used in a multi-channel A/T controller formed in accordance with this invention, they are not described here. After the calculations are complete, the channel counter value (i.e., CHAN) is incremented and the ALL CHANNELS DONE test is done is again performed. If all channels have not been done, CHAN is again tested to determine if it is equal to 1. If CHAN is not equal to 1, CHAN is tested to determine if it is equal to 2. If CHAN=2, the functions of the rating data and position data block 33 and the look up and calculate dynamic control parameters block 35 for the second channel 25b are performed. That is, rating limits are calculated for the second channel, the gains for dynamic control for the second channel are allocated, throttle control positions for the second channel are calculated, as are throttle limits using the rating and type data for the second engine. Thereafter, CHAN is incremented and the cycle is repeated. When the ALL CHANNELS DONE test is passed, the program subroutine illustrated in FIG. 3 ends and the CPU program cycles to its next subroutine.

FIG. 4 illustrates one method of carrying out the function of the engine identification blocks 31a, 31b, ... 31n. More specifically, FIG. 4 illustrates a pin block 39. The pin block 39 includes four binary codable segments designated 1, 2, 3 and 4. The pin block 39 also includes a positive voltage (+V) segment connected to a plus voltage source and a ground segment connected to ground. A first jumper connects segments 1 and 4 to the +V segment and a second jumper connects segments 2 and 3 to the ground segment. The +V segment encodes segments 1 and 4 with a binary 1 value and the ground segment encodes segments 2 and 3 with a binary 0 value. Consequently, the binary code produced by segments 1, 2, 3 and 4 taken in numerical order is 1001. A similar pin block encoding mechanism can be used to provide the same or other rating or type binary codes for each engine as well as common codes, such as thrust limits, etc. FIG. 5 is a binary code to decimal table illustrating, in a conventional manner, how a four-bit binary code can be utilized to produce 16 decimal number codes. Obviously, FIG. 4 is a simple illustrative example of a suitable encoding mechanism. It is to be understood that any one of a variety of other well-known electronic and mechanical coding systems can be utilized, if desired. These systems include two position toggle switches, plug in ROM, PROM and EPROM memories and coded plates positioned between photo diodes and a light source, for example. Another alternate implementation is to have an engine memory changed by a data loader.

As will be readily appreciated from the foregoing description, the invention provides an automatic throttle control for aircraft with intermixed engines. Rather than using a common channel to control the throttle position or thrust command of all engines, the invention provides separate control channels, one for each engine. The separate control channels allow separate control signals, based on the type and rating of each engine, plus common rating values and limits, to be used to provide separate control signals. This allows the engines to produce symmetrical thrust forces even though the engines are different and would produce different thrust values for the same control signal. It is this feature that allows an A/T control system formed in accordance with the invention to provide speed control while the using aircraft is performing a maneuver, such as auto landing, that cannot normally be performed with an aircraft having unmatched engines.

While a preferred embodiment of the invention has been illustrated and described, it will be appreciated that various changes can be made therein without departing from the spirt and scope of the invention. Consequently, within the scope of the appended claims, it is to be understood that the invention can be practiced otherwise than as specifically described herein.

The embodiments of the invention in which an exclusive property or privilege is claimed are defined as follows:

1. An automatic throttle controller for producing thrust control signals for aircraft with intermixed engines, said automatic throttle controller comprising:
   identification means for producing a code that identifies each side-mounted engine on an aircraft;
   processing means coupled to said identification means for receiving said engine identification code produced by said identification means and producing related parameter data for each engine based on said identification code; and, channel means coupled to said processing means for receiving said parameter data and producing a separate thrust control signal for each engine based on the parameter data associated with the related engine.

2. An automatic throttle controller is claimed 1, wherein said identification means produces a code that identifies each engine type.

3. An automatic throttle controller as claimed in claim 2, wherein said processing means includes rating data and position data processing means for reading said codes and producing limit signals based on said codes.

4. An automatic throttle controller as claimed in claim 3, wherein said processing means includes a look-up and calculate dynamic control parameter means for reading said codes and producing said related selected parameter data for each engine based on said codes.

5. An automatic throttle controller as claimed in claim 4, wherein said rating data and position data means and said look up and calculate dynamic control parameters means scans said identification means and obtains the code produced by said identification means for each engine, looks up type data based on said identification codes for each engine and stores said type data.

6. An automatic throttle control system as claimed in claim 5, wherein said rating data and position data means and said look up and calculate dynamic control parameters means separately calculate throttle limits based on said type data, separately calculates throttle control positions, separately allocates gains for dynamic control and separately calculates rating limits for each channel of said channel means.

7. An automatic throttle controller is claimed in claim 2, wherein said identification means also produces a code that identifies common data for said side-mounted engines.

8. An automatic throttle controller as claimed in claim 7, wherein said processing means includes rating data and position data processing means for reading said codes and producing limit signals based on said codes.

9. An automatic throttle controller as claimed in claim 8, wherein said processing means includes a look-up and calculate dynamic control parameter means for reading said codes and producing said related selected parameter data for each engine based on said codes.

10. An automatic throttle controller as claimed in claim 9, wherein said rating data and position data means and said look up and calculate dynamic control parameters means scans said identification means and obtains the code produced by said identification means for each engine, looks up type data based on said identification codes for each engine and stores said type data.

11. An automatic throttle control system as claimed in claim 10, wherein said rating data and position data means and said look up and calculate dynamic control parameter means separately calculate throttle limits based on said type data, separately calculates throttle control positions, separately allocates gains for dynamic control and separately calculates rating limits for each channel of said channel means.

12. An automatic throttle controller is claimed in claim 2, wherein said identification means also produces a code that identifies the rating of each engine.

13. An automatic throttle controller as claimed in claim 12, wherein said processing means includes rating data and position data processing means for reading said codes and producing limit signals based on said codes.

14. An automatic throttle controller as claimed in claim 13, wherein said processing means includes a look-up and calculate dynamic control parameter means for reading said codes and producing said related selected parameter data for each engine based on said codes.

15. An automatic throttle controller as claimed in claim 14, wherein said rating data and position data means and said look up and calculate dynamic control parameter means scans said identification means and obtains the code produced by said identification means for each engine, looks up rating and type data based on said identification codes for each engine and stores said rating and type data.

16. An automatic throttle control system as claimed in claim 15, wherein said rating data and position data means and said look up and calculate dynamic control parameter means separately calculate throttle limits based on said rating and type data, separately calculates throttle control positions, separately allocates gains for dynamic control and separately calculates rating limits for each channel of said channel means.

17. An automatic throttle controller is claimed in claim 1, wherein said identification means produces a code that identifies the rating of each side-mounted engine.

18. An automatic throttle controller as claimed in claim 17, wherein said processing means includes rating data and position data processing means for reading said codes and producing limit signals based on said codes.

19. An automatic throttle controller as claimed in claim 18, wherein said processing means includes a look-up and calculate dynamic control parameter means for reading said codes and producing said related selected parameter data for each engine based on said codes.

20. An automatic throttle controller as claimed in claim 19, wherein said rating data and position data means and said look up and calculate dynamic control parameter means scans said identification means and obtains the code produced by said identification means for each engine, looks up rating data based on said identification codes for each engine and stores said rating data.

21. An automatic throttle control system as claimed in claim 20, wherein said rating data and position data means and said look up and calculate dynamic control parameter means separately calculate throttle limits based on said rating data, separately calculates throttle control positions, separately allocates gains for dynamic control and separately calculates rating limits for each channel of said channel means.

22. An automatic throttle controller is claimed in claim 17, wherein said identification means also produces a code that identifies common data for said engines.

23. An automatic throttle controller as claimed in claim 22, wherein said processing means includes rating data and position data processing means for reading said codes and producing limit signals based on said codes.

24. An automatic throttle controller as claimed in claim 23, wherein said processing means includes a look-up and calculate dynamic control parameter means for reading said codes and producing said related selected parameter data for each engine based on said codes.

25. An automatic throttle controller as claimed in claim 24, wherein said rating data and position data means and said look up and calculate dynamic control parameter means scans said identification means and obtains the code produced by said identification means for each engine, looks up rating data based on said identification codes for each engine and stores said rating data.

26. An automatic throttle control system as claimed in claim 25, wherein said rating data and position data means and said look up and calculate dynamic control parameter means separately calculate throttle limits based on said rating data, separately calculates throttle control positions, separately allocates gains for dynamic control and separately calculates rating limits for each channel of said channel means.

* * * * *

UNITED STATES PATENT AND TRADEMARK OFFICE
CERTIFICATE OF CORRECTION

PATENT NO. : 5,006,993
DATED : April 9, 1991
INVENTOR(S) : D. R. Virnig et al.

It is certified that error appears in the above-identified patent and that said Letters Patent is hereby corrected as shown below:

| COLUMN | LINE | |
|---|---|---|
| 1 | 65 | Delete "pas," and insert therefor --past,-- |
| 6 | 40 | Delete "rest" and insert therefor --reset-- |
| 8 | 54 | Delete "spirt" and insert therefor --spirit-- |
| 9 | 8 | after "claimed" insert --in Claim-- |
| Title page, item [56] | 13th Listed Reference | Delete "4,813,063 5/1974 Martin" --3,813,063 5/1974 Martin--. |

Signed and Sealed this

Fifth Day of January, 1993

*Attest:*

DOUGLAS B. COMER

*Attesting Officer*  *Acting Commissioner of Patents and Trademarks*